United States Patent
Hori

(10) Patent No.: US 8,332,126 B2
(45) Date of Patent: Dec. 11, 2012

(54) CONTROL DEVICE OF INTERNAL COMBUSTION ENGINE

(75) Inventor: Yasuyoshi Hori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 729 days.

(21) Appl. No.: 12/540,928

(22) Filed: Aug. 13, 2009

(65) Prior Publication Data

US 2010/0263635 A1    Oct. 21, 2010

(30) Foreign Application Priority Data

Apr. 21, 2009    (JP) ................... 2009-102949

(51) Int. Cl.
*F02M 33/02*    (2006.01)
*F02D 41/30*    (2006.01)
(52) U.S. Cl. ....................... 701/104; 123/520
(58) Field of Classification Search .............. 123/520, 123/672, 704, 1 A, 466; 701/103–105, 107
See application file for complete search history.

(56) References Cited

U.S. PATENT DOCUMENTS

| 6,758,201 B2* | 7/2004 | Hosoi .................... 123/679 |
| 7,650,874 B2 | 1/2010 | Takubo |
| 8,170,775 B2* | 5/2012 | Hori ...................... 701/107 |
| 2010/0031941 A1 | 2/2010 | Hokuto |

FOREIGN PATENT DOCUMENTS

| JP | 2004-285972 A | 10/2004 |
| JP | 2008-144723 A | 6/2008 |
| JP | 2009-024504 A | 2/2009 |
| JP | 2010-209724 | * 9/2010 |
| JP | 2010-255434 | * 11/2010 |

OTHER PUBLICATIONS

Japanese Office Action dated Mar. 1, 2010, corresponding to Japanese Application No. 2009-102949.

* cited by examiner

*Primary Examiner* — Hai Huynh
(74) *Attorney, Agent, or Firm* — Sughrue Mion, PLLC

(57) ABSTRACT

A control device of an internal combustion engine includes a target air-fuel ratio set portion that sets a target air-fuel ratio according to an operating state of the internal combustion engine, an air-fuel ratio detection portion that detects an actual air-fuel ratio, a feedback correction value calculation portion that calculates a feedback correction value to correct a fuel injection amount for the actual air-fuel ratio to coincide with the target air-fuel ratio, and a fuel property change determination portion that determines a change of a fuel property on the basis of a change of a correction amount including a correction value for the fuel injection amount calculated on the basis of the feedback correction value in addition to the feedback correction value. The control device can determine a change of the fuel property accurately even when a change of the feedback correction value is reflected on another correction value.

10 Claims, 4 Drawing Sheets

CONTROL DEVICE OF INTERNAL COMBUSTION ENGINE

BACKGROUND OF THE INVENTION

1. Field of the Invention

The present invention relates to a control device of an internal combustion engine using a fuel having different fuel properties, particularly, a fuel having different alcohol mixing ratios.

2. Background Art

As is described, for example, in JP-2004-285972, a control device of an internal combustion engine of this type in the related art generally permits a concentration estimation in a fuel in a case where an air-fuel ratio correction amount to correct a fuel injection amount is outside a predetermined range even when an alcohol concentration estimation in the fuel is prohibited according to an operating state. According to the device in the related art, in a case where an air-fuel ratio correction amount is outside the predetermined range, a concentration estimation in the fuel is permitted. Hence, by using an estimated concentration estimate value, it becomes possible to prevent deterioration of the running performance and the emission performance caused by an insufficient correction amount.

The device in the related art determines a change of alcohol concentration and permits a concentration estimation in a case where the air-fuel ratio correction amount is outside the predetermined range. However, in a case where a change of the air-fuel ratio correction amount resulting from a change of the alcohol concentration is reflected on another correction amount using the air-fuel ratio correction amount, for example, a purge air concentration correction value, a change of the air-fuel ratio correction amount itself is reduced. This makes it impossible to determine a change of the alcohol concentration. It is therefore anticipated that an estimation of the alcohol concentration is no longer performed. In addition, because the purge concentration correction value takes a wrong value, suitable control is not performed when such a value is kept used.

In particular, in the case of a type that suitably estimates the purge air concentration and updates the purge air concentration correction value from a purge ratio, which is a ratio of a purge amount with respect to an intake air amount, and the purge air concentration when the purge amount has changed, in addition to an erroneous estimation of the purge air concentration due to influences of a change of the alcohol concentration, there is a possibility that a change direction of the alcohol concentration is also wrong.

In a case where the alcohol concentration changes to a low concentration side, the air-fuel ratio changes to a rich side. A feedback correction value therefore takes a value such that corrects the air-fuel ratio to a lean side. The purge air concentration is thus erroneously estimated that it has changed to a high concentration side. When the purge ratio increases in this state, the purge air concentration correction value is updated on the basis of the value erroneously estimated to be on the high concentration side. The purge air concentration correction value therefore takes a value such that corrects the air-fuel ratio further to the lean side.

Consequently, the feedback correction value conversely corrects the air-fuel ratio to the rich side. When a change of the alcohol concentration is determined in this instance, it is erroneously determined that the alcohol concentration has changed to the high concentration side because the feedback correction value takes a value that corrects the air-fuel ratio to the rich side.

SUMMARY OF THE INVENTION

The invention was devised to solve the problems discussed above and has an object to provide a control device of an internal combustion engine capable of determining a change of the fuel property accurately even in a case where a change of the feedback correction value to correct a fuel injection amount for an actual air-fuel ratio to coincide with a target air-fuel ratio is reflected on another correction value.

A control device of an internal combustion engine according to one aspect of the invention includes: a target air-fuel ratio set portion that sets a target air-fuel ratio according to an operating state of the internal combustion engine; an air-fuel ratio detection portion that detects an actual air-fuel ratio of the internal combustion engine; a feedback correction value calculation portion that calculates a feedback correction value to correct a fuel injection amount for the actual air-fuel ratio to coincide with the target air-fuel ratio; and a fuel property change determination portion that determines a change of a fuel property on the basis of a change of a fuel injection correction amount including a correction value for the fuel injection amount calculated on the basis of the feedback correction value in addition to the feedback correction value.

According to the control device of an internal combustion engine of the invention, even in a case where a change of the feedback correction value to correct the fuel injection amount for the actual air-fuel ratio to coincide with the target air-fuel ratio is reflected on another correction value, it is possible to determine a change of the air-fuel ratio resulting from a change of the fuel property in a reliable manner, so that the fuel injection can be controlled correspondingly to a change of the fuel property with accuracy.

The foregoing and other object, features, aspects, and advantages of the present invention will become more apparent from the following detailed description of the present invention when taken in conjunction with the accompanying drawings.

DESCRIPTION OF THE PREFERRED EMBODIMENT

Figure 1:
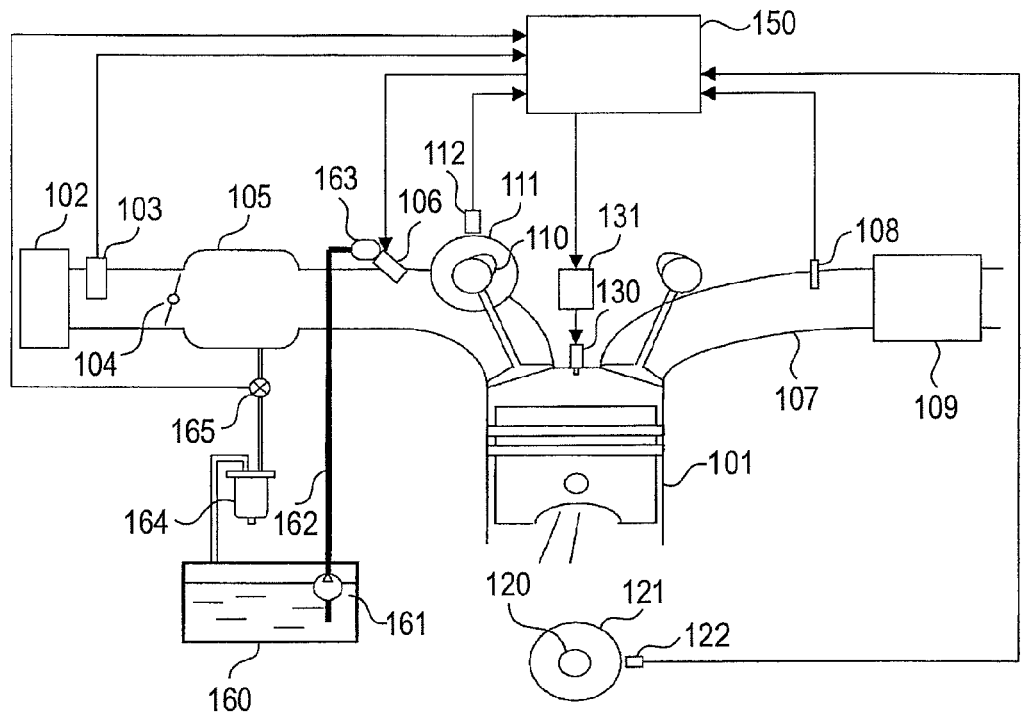
FIG. 1 is a view showing the system configuration of an internal combustion engine according to an embodiment of the invention.

Hereinafter, an embodiment of the invention will be described with reference to the drawings. FIG. 1 shows the system configuration of an internal combustion engine using an alcohol blended fuel according to an embodiment of the invention. Like components are labeled with like reference numerals in all the drawings.

Referring to FIG. 1, numeral 101 denotes an internal combustion engine, numeral 102 denotes an air cleaner that cleans an intake air to the internal combustion engine 101, numeral 103 denotes an airflow sensor that measures an intake air amount to the internal combustion engine 101, numeral 104 denotes a throttle valve that adjusts an intake air amount, numeral 105 denotes a surge tank, numeral 106 denotes a fuel injection valve provided to each cylinder of the internal combustion engine 101 and it supplies the fuel correspondingly to an operating state of the internal combustion engine 101.

Numeral 130 denotes a spark plug driven by a spark coil 131 and it ignites when a high voltage is supplied from the spark coil 131 to burn an air-fuel mixture within the combustion chamber. Numeral 107 denotes an exhaust tube that discharges an exhaust gas burnt within the combustion chamber, numeral 108 denotes an air-fuel ratio sensor that detects an air-fuel ratio of the exhaust gas, and numeral 109 denotes a three-way catalyst that purifies the exhaust gas.

Numeral 120 denotes a crank shaft, numeral 121 denotes an SG signal plate attached to the crank shaft 120, and numeral 122 denotes a sensor that generates an SGT signal, which is a crank angle signal, upon detection of a protrusion of the signal plate 121. The SGT signal is the reference of the computation timing of a fuel injection amount or the like and a rotational velocity of the internal combustion engine 101 is obtained from the cycle of this signal.

Numeral 110 denotes a cam shaft that is linked to the crank shaft 120 via unillustrated mechanical transmission means, such as a timing belt, and it rotates once while the crank shaft 120 rotates twice. Numeral 111 denotes a signal plate attached to the cam shaft 110 and numeral 112 denotes a sensor that generates a cam signal upon detection of a protrusion of the signal plate 111. The cylinder position is obtained on the basis of this signal.

Numeral 150 denotes a control unit that includes a CPU, a memory, and so forth, to which the fuel injection valves 106, the air-fuel ratio sensor 108, and so forth are connected.

An alcohol blended fuel supplied to the internal combustion engine 101 is stored in a fuel tank 160 provided with a fuel pump 161 and only a necessary amount is ejected by the fuel pump 161 at a predetermined pressure. The ejected fuel is supplied to the fuel injection valves 106 by way of a fuel tubing 162 and a delivery pipe 163, which are of a returnless configuration, and injected into the respective cylinders of the internal combustion engine 101. Numeral 164 denotes a canister that stores a fuel vapor generated from the fuel within the fuel tank 160. From the canister 164, a suitable amount of the fuel vapor (hereinafter, referred to as the purge air) controlled by a purge control valve 165 according to the operating state is introduced into the surge tank 105.

Figure 2:
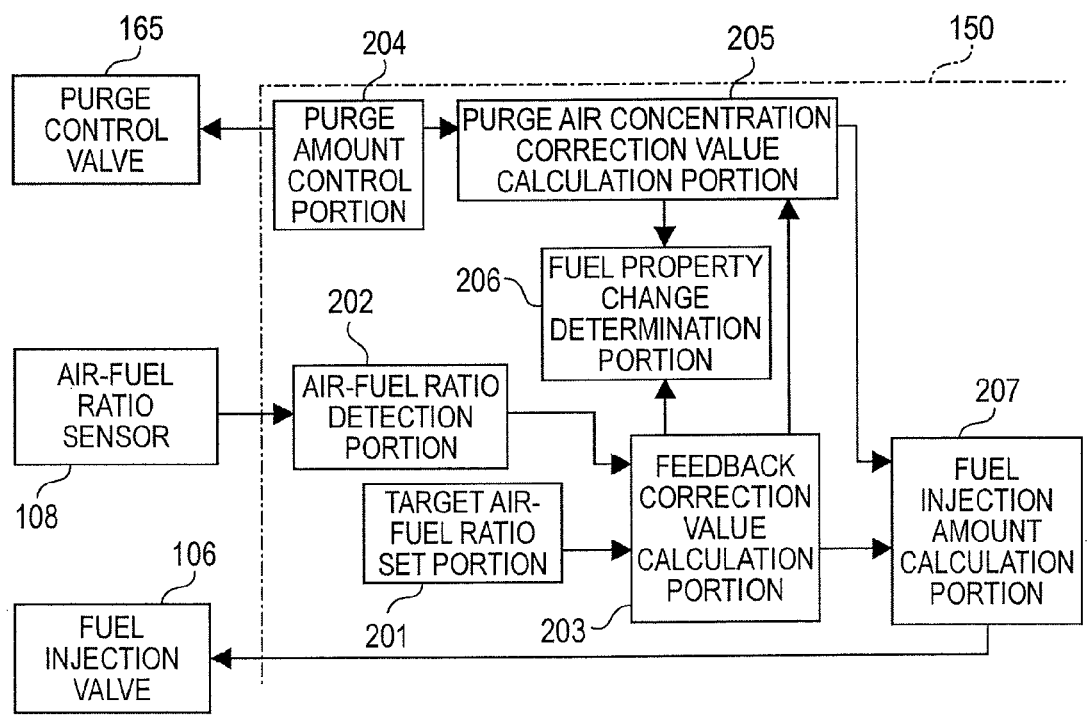
FIG. 2 is a block diagram showing the configuration of a major portion according to an embodiment of the invention.

FIG. 2 is a block diagram showing the configuration of a major portion of this embodiment and it chiefly shows a control portion included in the control unit 150. Numeral 201 denotes a target air-fuel ratio set portion that sets a target air-fuel ratio according to the operating state of the internal combustion engine 101. For example, it sets a theoretical air-fuel ratio in a normal operating region and sets a target air-fuel ratio to an over-rich air-fuel ratio at a high load. Numeral 202 denotes an air-fuel ratio detection portion that detects an actual air-fuel ratio from a signal of the air-fuel ratio sensor 108. Numeral 203 denotes a feedback correction value calculation portion that calculates a feedback correction value to correct a fuel injection amount for the actual air-fuel ratio to coincide with the set target air-fuel ratio. Because a range of the feedback correction value has to include a range used for an error determination or the like, it takes a value of 0.7 to 1.3 (±30%) by setting 1.0 as the value when there is no correction. It should be appreciated, however, that the feedback correction value is not limited to this range. All of the foregoing components are known and there is no problem when such known components are used in this embodiment. Accordingly, detailed descriptions are omitted herein.

Numeral 204 denotes a known purge amount control portion and it introduces a suitable amount of the purge air into the surge tank 105 by controlling the purge control valve 165 according to the operating state. The purge amount control portion 204 sets a purge amount to 0 (zero) when a fuel property change determination portion 206 described below makes a re-determination (f_jdg=1) or makes a concentration estimation while the alcohol concentration is changing (f_chg=1). Because there is no problem when known components are used as the other portions, detailed descriptions are omitted herein.

Numeral 205 denotes a known purge air concentration correction value calculation portion that calculates a purge air concentration correction value to correct a fuel injection amount from the purge amount and the feedback correction value. A known calculation method can be used as a calculation method of the purge air concentration correction value, and one example is as follows. That is, given that a variance of a feedback correction value average within a predetermined period while the purge air is introduced is a variance caused by the purge air, then the value in this instance is held as the purge air concentration correction value. Also, in order to calculate the purge air concentration correction value quickly also when the intake air amount or the purge amount changes, the purge air concentration is calculated from a purge ratio, which is a ratio of the purge amount with respect to the intake air amount, and the purge air concentration correction value, so that the purge air concentration correction value is updated from the purge ratio and the purge air concentration when the purge ratio has changed.

Numeral 206 denotes the fuel property change determination portion that is necessary when an alcohol blended fuel is used. It determines a change of the alcohol concentration, which is a change of the fuel property, in a case where a correction amount, which is a combination of the feedback correction value and the purge air concentration correction value, or the feedback correction value has a difference exceeding a predetermined value from the value before a predetermined fuel consumption amount. The fuel property change determination portion 206 also corrects the purge air concentration correction value and reflects a value comparable to the correction on the feedback correction value when a change of the alcohol concentration is determined in the presence of influences of the purge. The content of this processing will be described below in detail.

Numeral 207 denotes a fuel injection amount calculation portion that calculates a fuel injection amount by correcting the feedback correction value and the purge air concentration correction value calculated earlier for the calculated fundamental fuel injection amount. The fuel injection amount calculation portion 207 also corrects the alcohol concentration as in JP-A-2004-285972 mentioned above. It finally supplies the fuel to the internal combustion engine 101 by driving the fuel injection valve 106 according to the fuel injection amount thus obtained. The fundamental fuel injection amount is calculated from the rotational velocity and the intake air amount of the internal combustion engine 101. Also, a correction is, for example, to increase a fuel amount immediately after the start-up and at a low water temperature. The calculation and the correction are known and there is no problem when they are performed in known manners in this embodiment. Regarding the correction method using the feedback correction value calculated by the feedback correction value calculation portion 203, a correction can be reflected by methods similar to those of various corrections in the related art, and detailed descriptions are omitted herein.

Figure 3:
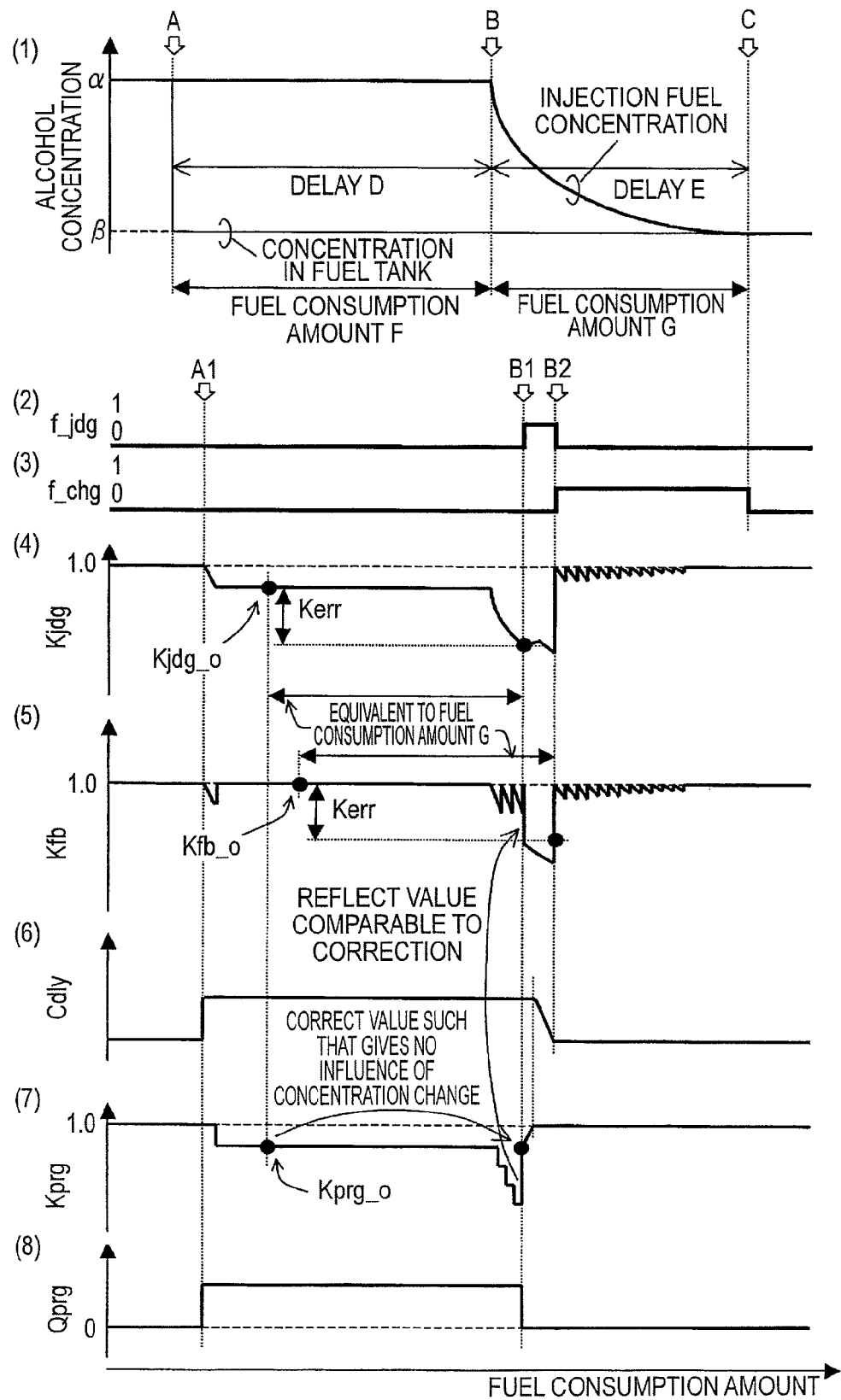
FIG. 3 is a timing chart in reference to a fuel consumption amount when a fuel having different alcohol concentrations is fed.

FIG. 3 is a timing chart in reference to a fuel consumption amount and shows an example of each parameter behavior when a fuel having different alcohol concentrations is fed. Referring to FIG. 3, parameters in the first row (1) indicate the alcohol concentration in the fuel tank 160 and the injection fuel. Herein, α denotes the concentration in the fuel tank before the fueling and β denotes the concentration in the fuel tank after the fueling.

Assume that a point A indicates the fueling, then it is thought that the fuel within the tank and the fed fuel are mixed substantially homogeneously within the fuel tank 160 because of fluidity during the fueling. Hence, the concentration in the fuel tank at the point A quickly changes to β. However, the alcohol concentration of the injection fuel to be supplied to the internal combustion engine 101 causes a delay as is shown in the drawing because the fuel system is of a returnless configuration. Accordingly, assume that a point B is a point at which the alcohol concentration of the injection fuel starts to change and a point C is a point at which the alcohol concentration of the injection fuel starts to become equal to the concentration β in the fuel tack after the fueling. Then, each of delays D and E corresponding to between A and B and between B and C, respectively can be determined in reference to a fuel injection amount.

The delay D (equivalent to a fuel consumption amount F) is equivalent to a fuel transfer delay from the fuel tank 160 to the delivery pipe 163 and corresponds to a fuel consumption amount equivalent to a capacity of the fuel tubing from the fuel tank 160 to the delivery pipe 163. The delay E (equivalent to a fuel consumption amount G) is a fuel mixture delay in the delivery pipe 163, and it is a delay caused when the fuel having the concentration α and remaining in the delivery pipe 163 before the fueling and the fuel having the concentration β supplied after the fueling are mixed in the delivery pipe 163. The fuel having the concentration β is supplied to the delivery pipe 163 together with the delay D caused earlier for the fuel consumption amount after the fueling, and the mixture behaves substantially correspondingly to the fuel consumption amount. Hence, the alcohol concentration of the injection fuel to be supplied to the internal combustion engine 101 behaves correspondingly to the fuel consumption amount indicated by a thick line of FIG. 3.

A parameter, f_jdg, in the second row (2) is a re-determination flag and it is set to 1 when a change of the alcohol concentration is determined in the presence of influences of the purge. It is a flag indicating a need to set the purge amount to 0 in order to make a determination again using a feedback correction value Kfb (fifth row (5)).

A parameter, f_chg, in the third row (3) is a fuel property change determination flag and it is set to 1 when a change of the alcohol concentration is determined. It is cleared to 0 at the point C at which a change of the alcohol concentration of the injection fuel ends.

A parameter, Kjdg, in the fourth row (4) indicates a correction amount, which is a combination of the feedback correction value Kfb (fifth row (5)) and a purge air concentration correction value Kprg (seventh row (7)). It is calculated according to a correction method of a fuel injection amount. In a case where the product of the feedback correction value and the purge air concentration correction value is used as a correction amount of the fuel injection amount, Kjdg can also be the product of these correction values. The Kjdg is calculated in this manner in this embodiment. It should be appreciated, however, that the calculation method is not limited to the method described above.

In a case where a fuel property change re-determination waiting counter Cdly (sixth row (6)) is not 0, a possibility of a change of the alcohol concentration is determined when a difference between the current Kjdg and Kjdg_o before a predetermined fuel consumption amount exceeds a predetermined value Kerr. Because the determination is made in the presence of influences of the purge, f_jdg is set to 1 (point B1) in order to make a determination again by setting the purge amount to 0.

About 0.2 to 0.3 is preferable as the value of the predetermined value Kerr, because it is a value not determined by a normal variance of the air-fuel ratio and susceptible to the normal purge air concentration correction value Kprg. Further, in order to prevent an erroneous determination caused by an instantaneous variance, a determination may be made only when the value keeps exceeding Kerr over a certain period. Regarding the predetermined fuel consumption amount, when consideration is given to a case where a determination is made in the latter half of the period of the delay E over which the alcohol concentration of the injection fuel changes as is shown in the first row (1), it is preferable to set the predetermined fuel consumption amount to an amount equivalent to the fuel consumption amount G. Before the fuel consumption amount G, the alcohol concentration of the injection fuel has not changed. It is therefore possible to obtain Kerr (Kfb and Kprg) unsusceptible to a change of the alcohol concentration.

The parameter, Kfb, in the fifth row (5) is the feedback correction value and the parameter, Kprg, in the seventh row (7) is the purge air concentration correction value. Herein, Kfb normally takes a value such that corrects a fuel injection amount for an actual air-fuel ratio to coincide with a target air-fuel ratio. However, a variance of Kfb is attributed to the purge air while the purge air is introduced (from A1 to B1) and is therefore reflected on Kprg. Hence, Kfb is in a state where there is substantially no correction.

On the contrary, the purge air concentration correction value Kprg is in a state where there is no correction when the purge air is not introduced, that is, Kprg=1.0, and the value of the feedback correction value Kfb is reflected thereon while the purge air is introduced as described above.

Also, at the fuel property change determination at the point B1, Kprg is corrected to the value before a change of the alcohol concentration and a value comparable to the correction of Kprg is reflected on Kfb so that Kjdg will not change. As with Kjdg described above, the value of Kprg before a change of the alcohol concentration can be a value Kprg_o before the value equivalent to the fuel consumption amount G. For example, given that the values before reflection are Kprg=0.7 and Kfb=1.0 and Kprg_o before the value equivalent to the fuel consumption amount G is 0.9, a corrosion is made so that Kprg=0.9 and Kfb=0.78 (=0.7/0.9). Accordingly, Kjdg has not changed before and after the reflection. An abrupt change of the fuel injection amount can be thus prevented.

A parameter, Qprg, in the eigh throw (8) indicates a purge amount and it is normally an amount controlled according to the operating state. However, when f_jdg=1, it is set to 0 in order to make an alcohol concentration change determination again using Kfb alone. When Qprg is set to 0, Kprg is unnecessary and is therefore set to 1.0, which is a state where there is no correction. However, because a correction corresponding to influences of the purge air remaining in the surge tank 105 is necessary, the correction is reduced gradually. Also, in order to eliminate the influences of the purge air, the purge amount is set to 0 in a case where a correction value for the alcohol concentration is estimated when f_chg=1.

The parameter, Cdly, in the sixth row (6) is the fuel property change re-determination waiting counter. It is set to a predetermined value when Qprg is not 0 or Kprg is not 1.0, and starts to count down when Qprg=0 and Kprg=1.0. As the predetermined value, the number of SGT signals, which becomes a period in which there are no influences of the purge air on Kfb, can be set and it can be a value of several tens.

At a point B2 at which Cdly becomes 0, the alcohol concentration change determination is made using Kfb again. As with Kjdg, a change of the alcohol concentration is determined in a case where a difference between the current Kfb and Kfb_o before the predetermined fuel consumption amount exceeds the predetermined value Kerr. Because the determination is made using Kfb, there are no influences of the purge air concentration correction value Kprg. Accordingly, it can be a small value in comparison with Kerr used for Kjdg when Cdly>0, and it is preferable to switch Kerr depending on whether Cdly is 0 or not.

In a case where a change of the alcohol concentration is determined again at the point B2, 1 is set to f_chg and f_jdg is also cleared to 0 when it is currently set to 1. Also, because f_chg remains at 1 in a period over which the alcohol concentration of the injection fuel changes, it is preferable to estimate a correction value for the alcohol concentration when f_chg=1 as is described in JP-A-2004-285972. In this case, because a value comparable to the change of Kfb is reflected on the correction value of the alcohol concentration, Kfb is in a state where there is substantially no correction.

Figure 4:
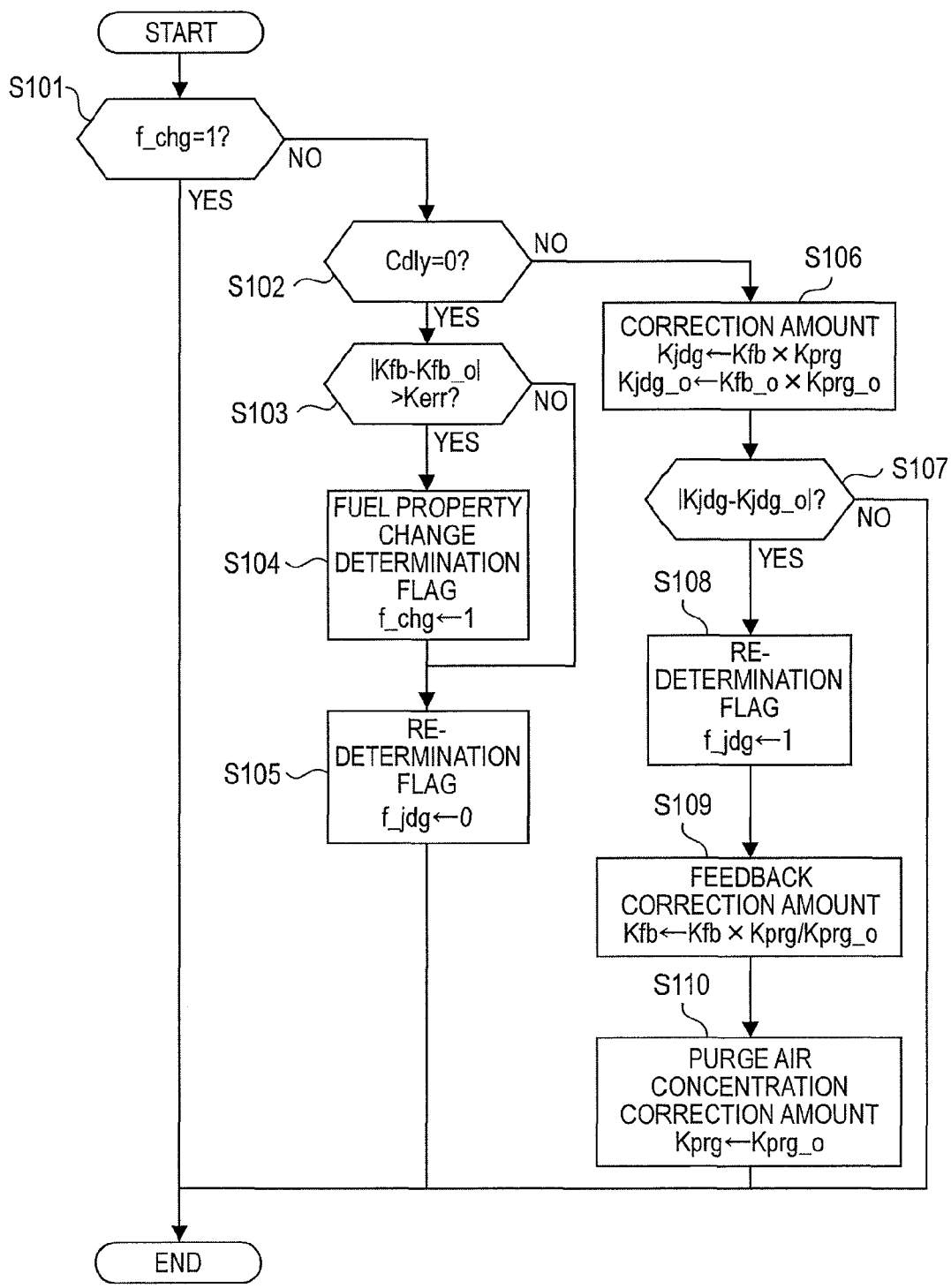
FIG. 4 is a flowchart of a procedure performed by a fuel property change determination portion in synchronization with an SGT signal according to an embodiment of the invention.
Figure 5:
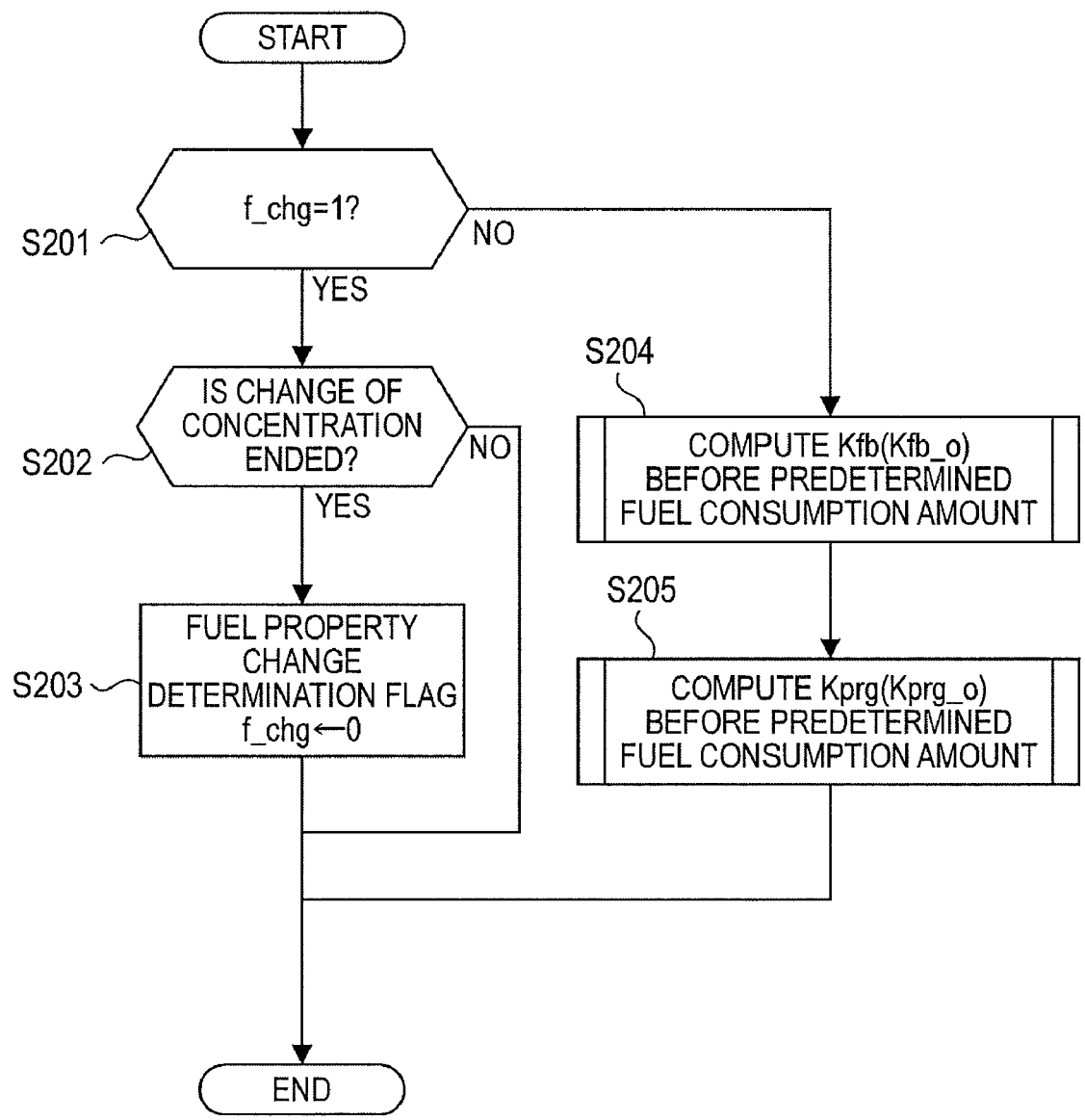
FIG. 5 is a flowchart of 0.01 second cycle processing by the fuel property change determination portion according to an embodiment of the invention.

The processing by the fuel property change determination portion 206 will now be described with reference to the flowcharts. The processing performed in synchronization with the SGT signal is depicted in FIG. 4 and the processing performed at certain cycles of 0.01 second is depicted in FIG. 5. Hereinafter, a capital S indicates a processing step.

Referring to FIG. 4 depicting the SGT signal synchronization processing, it is first determined in Step S101 whether the fuel property change determination flag f_chg is set to 1. In a case where the flag f_chg is set to 1, the alcohol concentration is changing. Herein, the processing is ended without any performance because an end determination of the alcohol concentration change is performed by the 0.01 second cycle processing. Meanwhile, in a case where the flag f_chg is set to 0, it is determined in Step S102 whether the fuel property change re-determination waiting counter Cdly is set to 0.

In a case where Cdly is set to 0, because there are no influences of the purge air on Kfb, it is determined whether the absolute value of a difference between the current feedback correction value Kfb and the value Kfb_o before the predetermined fuel consumption amount exceeds the predetermined amount Kerr in Step S103. In a case where the absolute value exceeds Kerr, it is determined that the alcohol concentration has changed and the fuel property change determination flag f_chg is set to 1 in Step S104. Finally, because a determination using the feedback correction value Kfb has been made in Step S103, the re-determination flag f_jdg is cleared to 0 in Step S105 to end the processing.

Meanwhile, in a case where Cdly is set to 1, because there are influences of the pure air, the current correction amount Kjdg and the correction amount Kjdg_o before the predetermined fuel consumption amount are calculated from the feedback correction value Kfb and the purge air concentration correction value Kprg in Step S106. In Step 107, whether the absolute value of a difference between Kjdg and Kjdg_o exceeds the predetermined value Kerr is determined.

In a case where a change of Kjdg exceeds Kerr, because there is a possibility of a change of the alcohol concentration, in order to make a determination again by setting the purge amount to 0, the re-determination flag f_jdg is set to 1 in Step S108. Also, in order to correct Kprg to the value before the change of the alcohol concentration while preventing an abrupt change of the fuel injection amount, Kprg/Kprg_o, which is a value comparable to the correction of the purge air concentration correction value Kprg, is reflected on the feedback correction value Kfb in Step S109. Also, the purge air concentration correction value Kprg is substituted by the purge air concentration correction value Kprg_o before the predetermined fuel consumption amount in Step S110 and the processing is ended.

For the purge air concentration in the purge air concentration correction value calculation portion 205, the value before the predetermined fuel consumption amount is held so that the purge air concentration is also corrected in this instance. Alternatively, the purge concentration may be simply initialized.

In a case where a change of Kjdg does not exceed Kerr, it is determined that the alcohol concentration has not changed and the processing is ended.

Referring to FIG. 5 depicting the 0.01 second cycle processing, it is determined whether the fuel property change determination flag f_chg is set to 1 in Step S201. In a case where the flag f_chg is set to 1, the end determination is made in Step S202 because the alcohol concentration is changing. As a method of the end determination, an end of the concentration change is determined in a case where the fuel consumption amount since the alcohol concentration started to change reaches a predetermined amount (equivalent to the fuel consumption amount G) as is shown in FIG. 3.

The start point of the change of the alcohol concentration is the actually determined point B1 or B2. Accordingly, when a change period of the alcohol concentration is defined as a period in which the fuel consumption amount becomes equivalent to the fuel consumption amount G, the period exceeds the point C. However, there is substantially no problem even the period over which a change of the alcohol concentration is determined extends to some extent. Further, because it is thought that the delay E varies, an allowance may be added to the fuel consumption amount G by taking a variance of the delay E into account.

In a case where the end of the change of the alcohol concentration is determined, the processing is ended by clearing the fuel property change determination flag f_chg to 0 in Step S203. In a case where there is no end determination, the processing is ended without any performance because the alcohol concentration is changing.

Meanwhile, in a case where the flag f_chg is set to 0, because the alcohol concentration is not changing, the feedback correction value Kfb_o and the purge air concentration correction value Kprg_o before the predetermined fuel consumption amount used when determining a change of the concentration are computed in Step S204 and Step S205, respectively, and the processing is ended.

As a method of computing the values before the predetermined fuel consumption amount, for example, a value is stored each time the fuel consumption amount reaches ⅒ of the predetermined fuel consumption amount and the value stored 11 values earlier is used as the value before the predetermined fuel consumption amount. When configured in this manner, it is possible to obtain at least the value before the predetermined fuel consumption amount. Also, in a case where the purge air concentration is also corrected when the re-determination flag f_jdg is set to 1, the value of the purge air concentration before the predetermined fuel consumption amount is held in the same manner as above.

In this embodiment, the purge air concentration correction value is used as the correction value for the fuel injection amount calculated on the basis of the feedback correction value. It should be appreciated, however, that the invention is not limited to this configuration. With a configuration in which the update rate of the value is so slow that it cannot follow a change of the alcohol concentration as in a type that stores values comparable to corrections corresponding to tolerances and deterioration of respective components in a known fuel system as learning values, the advantage of the invention is small. However, the invention is effective with a configuration in which the update rate is fast, such as corrections on the influences of a blow-by gas.

The invention is configured to determine a change of the fuel property without limiting the conditions particularly. However, for example, because fueling is generally performed while the engine is stopped, the determination maybe made only within a predetermined period alone since the start-up. When configured in this manner, it becomes possible to reduce the frequency of the re-determination made when the purge concentration is high and the purge air concentration correction value Kprg is corrected often. Hence, a determination can be made within a necessary range while the purge amount is secured.

Various modifications and alterations of this invention will be apparent to those skilled in the art without departing from the scope and spirit of this invention, and it should be understood that this is not limited to the illustrative embodiments set forth herein.

What is claimed is:

1. A control device of an internal combustion engine, comprising:
    a target air-fuel ratio set portion that sets a target air-fuel ratio according to an operating state of the internal combustion engine;
    an air-fuel ratio detection portion that detects an actual air-fuel ratio of the internal combustion engine;
    a feedback correction value calculation portion that calculates a feedback correction value to correct a fuel injection amount for the actual air-fuel ratio to coincide with the target air-fuel ratio; and
    a fuel property change determination portion that determines a change of a fuel property based on a change of a fuel injection correction amount including the feedback correction value and a purge air concentration correction value for the fuel injection amount calculated based on the calculated feedback correction value.

2. The control device of an internal combustion engine according to claim 1, wherein the internal combustion engine includes:
    a purge amount control portion that controls an amount of a fuel vapor to be introduced into an intake system of the internal combustion engine according to the operating state; and
    a purge air concentration correction value calculation portion that calculates the purge air concentration correction value on the basis of a purge amount, which is a fuel vapor amount introduced into the intake system, and the feedback correction value.

3. The control device of an internal combustion engine according to claim 2, wherein:
    in a case where the fuel property change determination portion determines a change of the fuel property when the purge amount is not 0, the purge amount control portion sets the purge amount to 0, and the fuel property change determination portion determines a change of the fuel property again on the basis of a change of the feedback correction value after there are no influences of the fuel vapor.

4. The control device of an internal combustion engine according to claim 2, wherein:
    the internal combustion engine is to pressure feed a fuel in an amount to be consumed from a fuel tank to an injector by a fuel pump; and
    the fuel property change determination portion stores the feedback correction value and the purge air concentration correction value for each predetermined fuel consumption amount, and determines a change of the fuel property by comparing a correction amount using the correction value for the fuel injection amount by the feedback correction value and the purge air concentration correction value stored therein with a correction amount using the correction value for the fuel injection amount by a current feedback correction value and a current purge air concentration correction value.

5. The control device of an internal combustion engine according to claim 4, wherein:
    when the fuel property change determination portion determines a change of the fuel property, the purge air concentration correction value calculation portion changes the purge air concentration correction value stored in the fuel property change determination portion to a current purge air concentration correction value, and the feedback correction value calculation portion reflects a value comparable to a change of the purge air concentration correction value on the feedback correction value.

6. The control device of an internal combustion engine according to claim 5, wherein:
    when the fuel property change determination portion determines a change of the fuel property in a case where the purge amount is not 0, the purge air concentration correction value calculation portion changes the purge air concentration correction value stored in the fuel property change determination portion to a current purge air concentration correction value, and the purge amount control portion sets the purge amount to 0 after the feedback correction value calculation portion reflects a value comparable to a change of the purge air concentration correction value on the feedback correction value.

7. The control device of an internal combustion engine according to claim 6, wherein the value comparable to the change of the purge air concentration correction value is a ratio between current purge air concentration correction value and previous purge air concentration correction value which is a purge air concentration correction value before a fuel injection.

8. The control device of an internal combustion engine according to claim 1, wherein:
    the fuel property is alcohol concentration in a fuel.

9. The control device of an internal combustion engine according to claim 1, wherein when the purge amount is not 0, the fuel property change determination portion:
    calculates current correction amount and previous correction amount based on the feedback correction value and the purge air concentration correction value,
    compares difference between the current correction amount and the previous correction amount to a predetermined threshold, and
    based on the comparison, determines whether or not to re-determine the change of the fuel property.

10. The control device of an internal combustion engine according to claim 1, wherein when purge amount is set to 0, the fuel property change determination portion:
    calculates current feedback correction value and previous feedback correction value,
    compares difference between the current feedback correction amount and the previous feedback correction amount to a predetermined threshold, and
    based on the comparison, determines the change of the fuel property.

* * * * *